United States Patent Office 3,847,873
Patented Nov. 12, 1974

3,847,873
PROCESS FOR THE PREPARATION OF
AROMATIC POLYESTERS
Peter Frederick Jackson and Arthur Morris, Runcorn,
England, assignors to Imperial Chemical Industries
Limited, London, England
No Drawing. Filed Nov. 1, 1972, Ser. No. 302,672
Claims priority, application Great Britain, Nov. 12, 1971,
52,596/71
Int. Cl. C08g 17/015
U.S. Cl. 260—75 R                    12 Claims

ABSTRACT OF THE DISCLOSURE

Production of polyesters in which the polycondensation is effected in the presence, as catalyst, of certain defined phosphinates or phosphonates having a specified minimum molecular weight.

The invention relates to the production of highly polymeric polyesters of aromatic dicarboxylic acids and dihydric alcohols.

Highly polymeric polyesters of aromatic dicarboxylic acids and dihydric alcohols are known to be useful thermoplastic materials capable of conversion to films, fibres and moulded articles having a desirable combination of physical and chemical properties. Examples of such polyesters are those prepared, for example, from terephthalic acid or 1,2-di(p-carboxyphenoxy)ethane and ethylene glycol or butane-1,4-diol or 1,4-dihydroxymethyl-cyclohexane.

Many processes have been proposed for the production of these polyesters but in general they proceed via the formation of the bis(dihydric alcohol) ester of the aromatic dicarboxylic acid and the polycondensation of this intermediate to highly polymeric polyester with loss of dihydric alcohol by heating in a molten state under reduced pressure. The bis ester may be formed, for example, by reaction of the aromatic dicarboxylic acid or of an ester-forming derivative thereof, e.g. a dialkyl ester, with the dihydric alcohol, or by reaction of the dicarboxylic acid with an ester-forming derivative of the alcohol, e.g. ethylene oxide or ethylene carbonate in the case of ethylene glycol. The process of reacting the acid with the dihydric alcohol is generally referred to as direct esterification, whereas the reaction of dialkyl ester with the bis(dihydric alcohol) is generally referred to as transesterification or ester interchange.

So as not to modify, dilute or lose the highly desirable characteristic properties of the highly polymeric polyesters of dihydric alcohols and aromatic dicarboxylic acids, it is usually preferred that the polycondensable material consist substantially entirely of one or more bis(dihydric alcohol) esters of aromatic dicarboxylic acids. However, the presence of a small concentration of other polycondensable material may be tolerated, if desired, for example to improve dyeability. However, it is usually preferred that at least 85 mole percent, and preferably at least 95 mole percent, of the polycondensable mixture consists of bis(dihydric alcohol) ester of aromatic dicarboxylic acid, or an oligomer thereof.

It has been proposed to carry out the polycondensation reaction in the presence of certain Group Vb compounds, particularly phosphorus compounds, for example in order to improve the properties of the product polymer.

Thus, our co-pending British patent application No. 3434/70 (equivalent to Netherlands patent application No. 7100864) describes and claims a process for the production of polyesters by the polycondensation of polycondensable material at least 85% of which consists of at least one bis(dihydric alcohol) ester of an aromatic dicarboxylic acid, in which said polycondensation is effected in the presence, as catalyst, of at least one simple or polymeric compound containing at least one metal atom attached to a least one monovalent anionic ligand, the remaining co-ordination and valency requirements of the metal atom being satisfied by one or more other ligands, the said monovalent anionic ligand being an anion of an acid having the structure

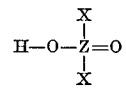

where each X is —R or —OR where R is a monovalent hydrocarbon group or substituted derivative thereof, or one group X has the structure

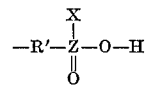

where R' is a divalent hydrocarbon group or dioxyhyrocarbon group, or substituted derivative thereof, and Z is a Group Vb element having an atomic number greater than 7.

Our co-pending British patent application No. 19286/70, (equivalent to Netherlands patent application No. 7105372) describes and claims a two-stage process for the production of highly polymeric polyesters by (1) transesterification of a mixture containing a dialkyl ester of an aromatic dicarboxylic acid and a dihydric alcohol and (2) subsequent polycondensation of the bis(dihydric alcohol) ester of the aromatic dicarboxylic acid formed, both stages being conducted in the presence of a catalytic system comprising a mixture of a metal salt containing a weakly acidic anion including oxide and a compound of the structure

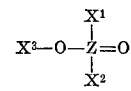

where $X^1$ is —R or —OR, $X^2$ is R and $X^3$ is H or R, where R is a monovalent hydrocarbon group or a substituted derivative thereof, and Z is a Group Vb element with an atomic number greater than 7.

We have now discovered that certain Group Vb compounds are particularly useful in the production of polyesters, at least during the polycondensation stage.

According to the present invention we provide a process for the production of highly polymeric polyester by polycondensation of a polycondensable material at least 85 mole percent of which consists of at least one bis(dihydric alcohol) ester of an aromatic dicarboxylic acid or an oligomer thereof, the polycondensation being effected in the presence, as catalyst, of a composition selected from the group consisting of mixtures and reaction products of a metallic component and an organic component, the metallic component being a metal oxide or a metal salt containing a weakly acidic anion and the organic component being a simple or polymeric compound of the structure I

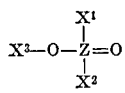

I where $X^1$ is —R or —OR, $X^2$ is —R, $X^3$ is H or —R, Z is an atom of a Group Vb element of the Periodic Table having a atomic number greater than 7, and each R, which may be he same or different is a monovalent hydrocarbon group or a substituted derivative thereof, wherein the total molecular weight of the groups R attached directly to the atom Z is greater than 145.

(All references to the Periodic Table are to the version of the Periodic Table of the Elements printed inside the back cover of F. A. Cotton and G. Wilkinson—Advanced Inorganic Chemistry, 2nd Edition (1966), Interscience Publishers, New York, London and Sydney.)

The organic component may be polymerised through the Group Vb atom, as in polyphosphinates, or through one of the groups R, as where R is vinylphenyl. In the latter case, the whole polymer chain is considered to be part of a group R attached to Z, so that the molecular weight of the group R may exceed 145 even though the molecular weight of a repeat unit of the polymer chain is below this figure.

An object of the invention is to carry out the reaction in the presence of a compound of structure I which is less volatile under polycondensation conditions than related compounds used hitherto. Generally compounds of structure I suitable for use in the invention lose less than 5% of their weight in 1½ hours at 285° C. under a pressure of 0.3 mm. Hg. In many cases the polyester produced is less subject to melt degradation than polyesters produced using conventional phosphorus compounds in the catalyst.

Examples of groups R are saturated aliphatic groups, for example paraffinic hydrocarbons, containing 12 or more carbon atoms and aromatic hydrocarbons, preferably containing at least two linked aromatic rings, and containing at least 12 carbon atoms. The groups R may be polymeric: for example $X^1$ and $X^2$ may be a poly(p-vinylphenyl) group with phosphinate residues attached to a common polystyrene chain.

Preferably at least one group R attached to Z is selected from dodecyl, biphenyl, hexadecyl and poly(p-vinylphenyl).

The remaining groups R are not particularly critical. Conveniently they may be aliphatic, for example methyl, ethyl, propyl, butyl, hexyl, cyclohexyl, octyl.

Preferably Z is phosphorus, but the use of arsenic and heavier Group Vb elements is not excluded.

The metal in the metallic component is preferably zinc, manganese or aluminum. Other metal salts or oxides may also be used, for example those of lanthanum, cobalt, calcium or cadmium.

The metallic component and organic component may be used in simple admixture, preferably in the molar ratio of 1:1 to 1:2. Alternatively they may be pre-reacted together directly or in a solvent such as ethanol or glycol.

Preferred metal salts include the anions of organic acids or enolisable β-diketones, for example acetylacetone. Preferably the salt is an aliphatic carboxylate. Especially preferred are the aliphatic acid salts of zinc, for example zinc acetate.

The invention is especially applicable to the production of polyesters wherein the dicarboxylic acid is at least 80 mole percent terephthalic acid but other aromatic acids may also be used. Examples of other aromatic dicarboxylic acids include isophthalic acid and dinuclear dicarboxylic acids, for example, those represented by the structure II.

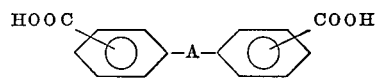

II where A is a direct link or a divalent atom or group which is inert under reaction conditions.

Examples of dihydric alcohols that may be used are α,β-polymethylene glycols, especially those having the structure $HO(CH_2)_xOH$ where $x$ is from 2 to 10, branched aliphatic diols, e.g. 3,3,5-trimethylhexane-1,6-diol and neopentyl glycol, and alicyclic diols, e.g. 1,4-di(hydroxymethyl)cyclohexane and 2,2,4,4-tetramethyl cyclobutane-1,3-diol. Ethylene glycol and butane diol are preferred, especially the former.

The amount of catalyst used, calculated on the basis of weight of metallic component percent weight of dimethyl ester of terephthalic acid (or equivalent if other acids are used) may be in the range 0.0001 to 0.05%, preferably 0.005 to 0.05%. If the polycondensable material, for example bis(ethylene glycol) terephthalate, is prepared by ester interchange from a dialkyl ester of an aromatic dicarboxylic acid, for example dimethyl terephthalate, the catalyst may in some cases also be used as the ester interchange catalyst.

Conventional reaction conditions may be used for the polycondensation reaction and other additives may be included before, during or after the reaction, for example for delustering, stabilising, pigmenting and/or otherwise modifying the high molecular weight polyester product. A preferred delustrant, particularly during polycondensation, is titanium dioxide.

The invention is now illustrated by the following Examples, in which quantities are expressed as parts by weight.

Intrinsic viscosities (I.V.) of the product polymer were determined from the relative viscosities measured in 1% solution in o-chlorophenol at 25° C. Polymer colour (L and Y values) was measured on a "Colormaster V" analytical instrument. The melt degradation rate (M.D.) is the rate of change of the log (melt viscosity) with time at 284° C.

Bis(ethylene glycol) terephthalate pre-polymer was prepared in conventional manner by ester-interchange or direct esterification. 480 parts of pre-polymer and the appropriate quantity of catalyst were charged to a stainless steel autoclave, provided with a double helical metal stirrer, a vacuum off take and condensing arrangements for volatile materials.

2.4 parts of titanium dioxide were added to give a delustered polymer. The temperature was then raised to 285° C. Pressure within the vessel was then reduced to 0.5 mm. of mercury absolute over a period of 30 minutes, and heating was continued for the indicated time. The polymeric reaction product was extruded onto chill-cast rollers and the properties of the product polymer measured.

The catalyst system was varied in each Example. In Examples 1–5 and the comparative example, 0.072 parts of zinc acetate dihydrate were used, with two equivalents of the phosphorus compound. In Example 6, the metallic component was aluminum acetylacetonate (0.027% by weight), in admixture with diethyl hexadecylphosphonate (0.052% by weight; molar ratio organic component/metallic component 1.8:1).

The polymer used in Example 5 was prepared by the reaction of p-vinylphenyl magnesium chloride with diethyl chlorophosphonate and hydrolysing the product with saturated ammonium chloride solution. An insoluble polymer was formed.

The results are given in the following Table, which also includes a comparative example employing a low molecular weight phosphorus compound.

| Example | Metallic component | Organic component | Polycondensation time (hr.-min.) | Softening point (°C.) | L | Y | IV | MD (1 hr.$^{-1}$) | Phosphorus retention (percent of theoretical retention) |
|---|---|---|---|---|---|---|---|---|---|
| Comparative | Zinc acetate | Dimethyl methylphosphonate $(CH_3O)_2 P(O)CH_3$ | 0-52 | 262.3 | 79 | 17 | 0.66 | 0.25 | 19 |
| 1 | do | Diethyl dodecylphosphonate $(C_2H_5O)_2 P(O) C_{12}H_{25}$ | 1-19 | 260.3 | 78 | 14 | 0.71 | 0.18 | 49 |
| 2 | do | Diethyl hexadecylphosphonate $(C_2H_5O)_2 P(O) C_{16}H_{33}$ | 1-22 | 261.1 | 79 | 14 | 0.70 | 0.20 | 39 |
| 3 | do | Ethyl bis (p-biphenyl)phosphinate $C_2H_5OP(O)\left(-\bigcirc-\bigcirc\right)_2$ | 1-30 | 260.3 | 78 | 24 | 0.66 | 0.19 | 100 |
| 4 | do | Ethyl bis(hexadecyl)phosphinate $C_2H_5OP(O) (C_{16}H_{33})_2$ | 1-37 | 260.4 | 76 | 27 | 0.69 | 0.16 | (¹) |
| 5 | do | Poly(diethyl p-vinylphenylphosphonate) 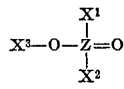 | 1-30 | 261.1 | 76.5 | 16 | 0.61 | 0.14 | (¹) |
| 6 | Aluminium acetylacetonate. | Diethyl hexadecylphosphonate $(C_2H_5O)_2P(O)C_{16}H_{33}$ | 1-10 | 257.2 | 75.5 | 25 | 0.71 | 0.11 | 61 |

¹ Not measured.

What we claim is:

1. In a process for the production of highly polymeric polyester by polycondensation of a polycondensable material at least 85 mole percent of which consists of at least one bis(dihydric alcohol) ester of an aromatic dicarboxylic acid, or an oligomer thereof, the improvement comprising the employment as catalyst of a catalytic amount of a composition consisting essentially of a metallic component and an organic component, the metallic component being a metal oxide or a metal salt containing a weakly acidic anion, said metal is selected from the group consisting of zinc, manganese, aluminum, lanthanum, cobalt, calcium and cadmium, and the organic component being a simple or polymeric compound of the structure $$X^3-O-Z=O \quad \begin{matrix} X^1 \\ | \\ | \\ X^2 \end{matrix}$$

where $X^1$ is —R or —OR, $X^2$ is —R, $X^3$ is —H or —R, Z is an atom of a Group Vb element of the Periodic Table having an atomic number greater than 7, and each R, which may be the same or different, is a monovalent hydrocarbon group, wherein the molecular weight of at least one of the groups R attached directly to the atom Z is greater than 145.

2. The process of claim 1 in which the groups R directly linked to the atom Z are aromatic or saturated aliphatic groups and contain at least twelve carbon atoms.

3. The process of claim 2 in which at least one group R attached to the atom Z is dodecyl, hexadecyl or biphenyl.

4. The process of claim 2 in which at least one group R attached to the atom Z is poly-(p-vinylphenyl).

5. The process of claim 1 in which the atom Z is phosphorus.

6. The process of claim 1 in which the metal is zinc.

7. The process of claim 1 in which the metal is aluminum.

8. The process of claim 1 in which the metal salt is a salt of an organic acid or an enolisable β-diketone.

9. The process of claim 8 in which the metal salt is an aliphatic carboxylate.

10. The process of claim 1 in which the catalyst is a mixture of metallic component and organic component and the molar ratio of the metallic component and the organic component is in the range 1:1 to 1:2.

11. The process of claim 1 in which the amount of catalyst is 0.0001 to 0.05% by weight of the dimethyl ester of the aromatic dicarboxylic acid, calculated on the basis of the metallic component.

12. The process of claim 1 in which the aromatic dicarboxylic acid is at least 80 mole percent terephthalic acid.

References Cited

UNITED STATES PATENTS

| | | | |
|---|---|---|---|
| 3,489,722 | 1/1970 | Ketani et al. | 260—75 P |
| 3,651,017 | 3/1972 | Tanabe et al. | 260—75 R |
| 3,406,153 | 10/1968 | Eaton et al. | 260—75 P |
| 3,412,066 | 11/1968 | Schnegg et al. | 260—75 R |

HAROLD D. ANDERSON Primary Examiner

T. E. PERTILLA, Assistant Examiner

U.S. Cl. X.R.

260—873